F. TOMPKINS.
VEHICLE WHEEL.
APPLICATION FILED JAN. 16, 1909.
962,066.
Patented June 21, 1910.
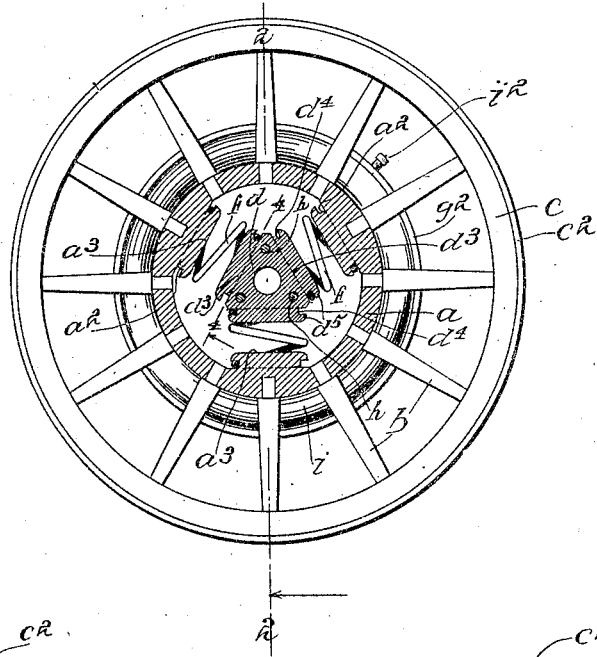
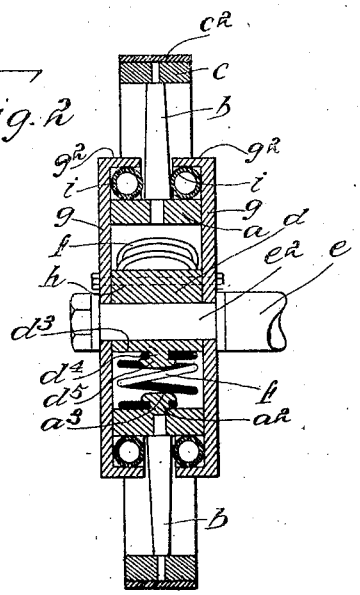
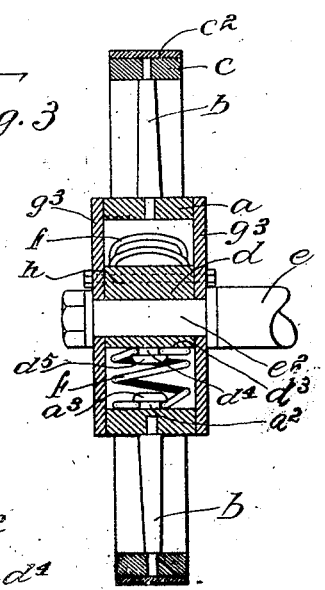
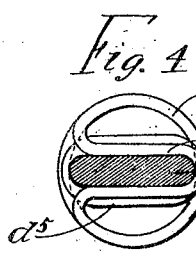
WITNESSES:
INVENTOR
Franklin Tompkins
BY
ATTORNEYS.

UNITED STATES PATENT OFFICE.

FRANKLIN TOMPKINS, OF NEW DORP, NEW YORK.

VEHICLE-WHEEL.

962,066.

Specification of Letters Patent.

Patented June 21, 1910.

Application filed January 16, 1909. Serial No. 472,607.

*To all whom it may concern:*

Be it known that I, FRANKLIN TOMPKINS, a citizen of the United States, and residing at New Dorp, Staten Island, in the county of Richmond and State of New York, have invented certain new and useful Improvements in Vehicle-Wheels, of which the following is a specification, such as will enable those skilled in the art to which it appertains to make and use the same.

This invention relates to the wheels of automobiles and other vehicles; and the object thereof is to provide an improved cushioned wheel of this class without the use of pneumatic tires; a further object being to provide a vehicle wheel having inner and outer hubs between which are placed spiral springs which bear the load placed on the wheel and take up the greater amount of the jolt, jar or shock occasioned in the use of the vehicle and prevent the said jolt, jar or shock from being transmitted to the framework of the vehicle; and with these and other objects in view the invention consists in a wheel of the class specified constructed as hereinafter described and claimed.

The invention is fully disclosed in the following specification, of which the accompanying drawing forms a part, in which separate parts of my improvement are designated by suitable reference characters in each of the views, and in which;—

Figure 1 is a sectional side view of a wheel involving my invention, Fig. 2 a partial section on the line 2—2 of Fig. 1, Fig. 3 a view similar to Fig. 2, but showing another form of construction, and Fig. 4 a detail sectional view on the line 4—4 of Fig. 1.

In the practice of my invention I provide a main outer hollow hub member $a$ with which the spokes $b$ are connected, and connected with the spokes $b$ is the usual rim $c$ provided with the usual tire $c^2$.

Placed concentrically within the main outer hollow hub member $a$ is a central supplemental hub member $d$, and the spindle or journal $e^2$ of the axle $e$ passes through said central supplemental hub member $d$ as clearly shown.

The hub member $d$ is provided with a plurality of faces $d^3$ which, in the form of construction shown, are three in number, and said hub member in this construction is substantially triangular in cross section, and each face of the hub member $d$ is provided with a neck or projection $d^4$ which is oblong in cross section and provided with a head $d^5$ and opposite each face of the hub member $d$, the main outer hollow hub member $a$ is provided on its inner face with a corresponding neck or projection $a^2$ which is also oblong in cross section, in the form of construction shown the same as the neck or projection $d^4$ which is clearly shown in Fig. 4, and provided with a head $a^3$. I also provide a plurality of spiral springs $f$ which equal in number the faces of the hub member $d$, and these springs are provided at their opposite ends with U-shaped loops $f^2$ which engage the necks $a^2$ on the inner surface or inner face of the hub member $a$ and the necks $d^4$ on the faces of the hub member $d$ and are held in engagement therewith and with the hub members $a$ and $d$ by the heads $d^5$ and $a^3$ of said necks, and these springs operate both as tension and compression springs. By forming the necks or projections $a^2$ and $d^4$ oblong in transverse section and providing the springs $f$ with U-shaped or oblong loops at their ends, the operation of said springs is facilitated and the strain thereon equalized. I also secure to the central hub member $d$ in the construction shown in Figs. 1 and 2 side plates $g$ which are of a diameter sufficient to inclose the hub member $a$, and these plates inclose the springs $f$ and the central hub member $d$, and said plates are preferably secured to the hub member $d$ by bolts $h$ passed therethrough. With this construction the hub member $d$ is centered in the hub member $a$ by the springs $f$, and said springs carry the load and any jolt or jar resulting from the vehicle passing over rough or uneven roads or obstructions in roads is taken up by said springs.

The hub member $a$ is movable toward and from the hub member $d$ between the plates $g$ and is always held in proper position by said plates and the result is similar to that of a cushioned tire.

In the construction shown in Figs. 1 and 2 the plates $g$ are provided at their perimeters with inwardly directed flanges $g^2$ between which and the hub member $a$ are placed elastic or pneumatic tubes $i$, or other elastic devices, and these devices as will be readily understood, in the operation of the wheel, add to the elasticity thereof or the cushioning effect produced by the springs $f$.

In the construction shown in Fig. 3, I secure to the central hub by means of bolts $h$ plates $g^3$ which are similar to the plates $g$ shown in Figs. 1 and 2, but the diameter of which is less than that of the plates $g$ and the elastic devices $i$ shown in Figs. 1 and 2 are not employed in the construction shown in Fig. 3, but with this exception the construction and operation of the wheel shown in Fig. 3 is the same as that shown in Figs. 1 and 2.

By means of my improvement I provide a wheel which possesses all the qualities of a pneumatic tire wheel, and one which is much cheaper in construction and operation, and my invention is not limited to the exact details of construction herein shown and described; and changes therein and modifications thereof may be made, within the scope of the appended claims, without departing from the spirit of my invention or sacrificing its advantages.

It will be understood that the tubes $i$ may be inflated in the usual manner through a valve device $i^2$, and other annular flexible and elastic devices may be substituted for said tubes if desired, and in the operation of my improved wheel the hub members $a$ and $d$ are normally held in the position shown in the drawing, but said hub members are relatively movable toward and from each other, and any jolt or jar occasioned by the operation of the vehicle is taken up by the springs $f$, or by the springs $f$ and the elastic or pneumatic tubes $i$ when the latter are employed and a perfect cushioning effect is thus produced.

Having fully described my invention, what I claim as new and desire to secure by Letters Patent, is;—

1. A wheel of the class described comprising a central hub member, an outer hub member encircling the central hub member and provided with spokes to which the rim of the wheel is secured, side plates secured to the central hub member and inclosing the outer hub member, tension and compression springs placed between said hub members and secured thereto, the said side plates being provided at their perimeters with inwardly directed flanges, and elastic devices placed between the outer hub member and said flanges.

2. A wheel of the class described comprising a central hub member and an outer hub member encircling said central hub member, side plates secured to the central hub member and inclosing the outer hub member, said hub members being provided, one with inwardly directed and the other with outwardly directed headed projections, and spiral springs placed between said hub members and provided at their opposite ends with loops which engage the necks of said projections, said springs operating as both tension and compression springs, and said outer hub member being provided with spokes to which the rim of the wheel is secured, and said side plates being provided at their perimeters with inwardly directed flanges, and elastic devices placed between said flanges and the outer hub member.

3. A wheel of the class described comprising a central hub member and an outer hub member encircling said central hub member, side plates secured to the central hub member and inclosing the outer hub member and between which the outer hub member is radially movable, said outer hub member being provided with spokes to which the rim of the wheel is secured, and said hub members being provided, one with outwardly directed and the other with inwardly directed headed projections which are oblong in cross section and spiral springs placed between said hub members and provided at their opposite ends with U-shaped loops which engage the necks of said projections, said springs operating both as tension and compression springs.

4. A wheel of the class described, comprising a central hub member and an outer hub member encircling said central hub member, said hub members being movable toward and from each other, and spiral springs placed between said hub members and provided at their ends with U-shaped loops adapted to engage corresponding projections on said hub members.

5. In a device of the class described, a helical spiral spring the ends of which are provided with U-shaped loops in planes at right angles to the axis of the spring.

In testimony that I claim the foregoing as my invention I have signed my name in presence of the subscribing witnesses this 14th day of January 1909.

FRANKLIN TOMPKINS.

Witnesses:
C. E. MULREANY,
HARRY R. CANFIELD.